(12) United States Patent
Färber et al.

(10) Patent No.: US 6,669,277 B2
(45) Date of Patent: Dec. 30, 2003

(54) WIND DEFLECTOR FOR MOTOR VEHICLE ROOF

(75) Inventors: Manfred Färber, Wielenbach (DE); Jadi Karami, Ottobrunn (DE); Bodo Von Czarnowski, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/208,248

(22) Filed: Jul. 31, 2002

(65) Prior Publication Data

US 2003/0038512 A1 Feb. 27, 2003

(30) Foreign Application Priority Data

Aug. 1, 2001 (DE) .......................................... 101 37 363

(51) Int. Cl.[7] .................................................. B60J 1/20
(52) U.S. Cl. ...................................................... 296/217
(58) Field of Search ................................. 296/217, 152

(56) References Cited

U.S. PATENT DOCUMENTS 4,844,538 A    7/1989  Ricks 5,609,388 A    3/1997  Hattass et al.

FOREIGN PATENT DOCUMENTS

| DE | 40 39 485 C1 | 5/1992 |
| DE | 44 02 314 A1 | 8/1995 |
| DE | 196 03 670 C1 | 4/1997 |
| EP | 0 490 213 A1 | 6/1992 |
| EP | 0 955 194 A1 | 11/1999 |

*Primary Examiner*—Dennis H. Pedder
(74) *Attorney, Agent, or Firm*—Nixon Peabody LLP; David S. Safran

(57) ABSTRACT

The invention relates to a wind deflector for a closable motor vehicle roof or a roof module, in which the wind deflector has a flexible layer formed at least in part as air-permeable net. The flexible layer is attached on at least two opposing sides to braces, one of the braces being connected laterally to a swiveling raising arm which is located on a roof frame of the motor vehicle roof or module. At least one other brace, which is connected to another swiveling raising arm, is attached to the layer. The invention also relates to a motor vehicle roof or roof module including the wind deflector.

19 Claims, 2 Drawing Sheets

WIND DEFLECTOR FOR MOTOR VEHICLE ROOF

BACKGROUND OF THE INVENTION

1. Technical Field

The present invention relates to a wind deflector for a closable motor vehicle roof or a roof module in which the wind deflector includes a flexible layer which is made in part as an air-permeable net and is attached on at least two opposing sides to braces, one of the braces being connected laterally to a swiveling raising arm which is located on the roof frame of the motor vehicle roof.

2. Description of Related Art

German Patent 40 39 485 C1 discloses a device for reducing noise and vibration on openings of motor vehicles exposed to tangential overflow, such as especially on sliding roof openings. One wind deflector projects to the outside from the motor vehicle outline and is provided, at least in partial areas of its surface, with an air permeable net. German Patent 196 03 670 C1 discloses a wind deflector for an openable motor vehicle roof wherein a thin-walled layer, which forms the body of the wind deflector, is attached on two opposing sides to braces which are detachably mounted on the motor vehicle roof or on a part connected to the latter for cleaning purposes.

The wind deflectors described in the above-noted patents, however, have some extent of unwanted noise and vibration generation in the opened state and furthermore cannot be transferred into the closed state via defined folding of the air-permeable net or the thin-walled layer.

SUMMARY OF THE INVENTION

One object of the present invention is to offer a wind deflector for a closable motor vehicle roof or a roof module which, in the opened state, effectively suppresses noise and vibration and can be transferred via defined folding of the net or thin-walled layer into the closed state. Another object is to provide a motor vehicle roof, and a roof module, with a wind deflector capable of achieving the above objective.

The above object, and other objects, are achieved by providing a wind deflector for one of a closable motor vehicle roof having a roof frame and a roof module having a roof frame, comprising a flexible layer at least partially formed of an air-permeable net and a respective brace positioned on each of at least two opposing sides of said flexible layer wherein each of at least two opposing sides of said flexible layer is attached to a respective brace. The wind deflector also includes a swiveling raising arm mountable on the roof frame of one of the motor vehicle roof and roof module, one of said braces being connected laterally to said swiveling raising arm. The deflector also includes at least one additional brace attached to said flexible layer and another swiveling arm connected to the at least one additional brace. This object is also achieved for a motor vehicle roof and a roof module including the wind deflector of the present invention.

The wind deflector of the present invention includes at least one other brace for attachment of the flexible layer, the other brace being provided laterally with another swiveling raising arm for stabilization of the wind deflector and for suppression of unwanted noise and vibrations (rumbling). Furthermore, the additional brace allows defined folding of the flexible layer which forms the body of the wind deflector when the wind deflector is being closed.

In one advantageous embodiment, the swiveling raising arms for holding the braces are detachably mounted on the motor vehicle roof or a part which is connected to the roof. In the opened state of the wind deflector, the raising arms are raised. In the closed state, the raising arms adjoin the motor vehicle roof or a part connected to the roof.

Advantageously, the wind deflector has a first upper brace and a second lower brace and the additional brace is mounted essentially in the middle between the first upper and the second lower brace. By stabilizing the individual braces by the raising arms or by attachment, for example via a clamp strip or clip connection, the wind deflector can be stabilized as desired over its entire surface in the opened state.

The (thin-walled) flexible layer which forms the body of the wind deflector is made especially as a net part (net wind deflector) and advantageously has at least one loop through which one brace can be routed for attachment to the layer. The swiveling parts can be detachably connected to the braces via movable holding parts. These holding parts are known and can be made as knurled nuts or knurled screws. In this way, the holding parts can be removed from the braces without an additional tool, for example, for cleaning the wind deflector.

For further stabilization and noise reduction of the wind deflector, there can be other swiveling parts which likewise can be made as raising arms and which are mounted preferably in the lateral direction essentially in the middle between the existing raising arms which are mounted laterally on the braces. Thus the wind deflector, which extends essentially over the entire width of the motor vehicle roof, is also stabilized over its entire width by preferably several movable parts which are located between the left and right side of the motor vehicle. These movable parts, which are located in the intermediate area or in the middle, can be made as supporting wires or as supporting screens. These movable parts are also preferably detachably mounted on the motor vehicle roof or on a part connected to the roof.

Further streamlining of the wind deflector is achieved by profile elements which extend over the entire width or individual component areas of the wind deflector. In particular, these profile elements are connected to the upper brace of the wind deflector. By forming the profile elements in cross section in the form of airfoils, the desired streamlining effects are achieved for stabilization of the opened wind deflector.

The motor vehicle roof, and roof module, of the present invention with a wind deflector have the above-described features and advantages of the wind deflector of the present invention.

DETAILED DESCRIPTION OF THE PREFERRED EMBODIMENTS

Figure 1:
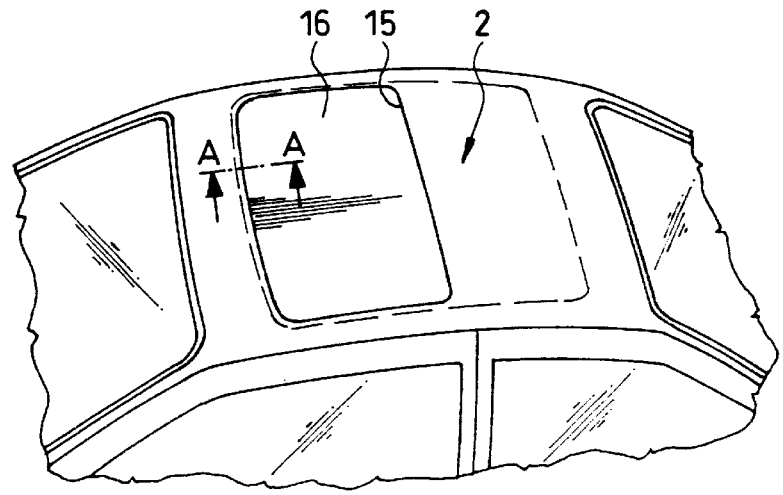
FIG. 1 shows a schematic perspective of a motor vehicle roof of the present invention.

FIG. 1 shows a motor vehicle roof 2 (which may be in the form of a roof module which has been inserted in the area of the broken lines in FIG. 1) with a roof opening 15 which can be selectively closed, or partially cleared, by means of a cover 16 which is shown in the closed state. Underneath the roof opening 15 is a roof frame 6 on which conventional elements (not shown), for example guide rails or sliding blocks, are located for moving the cover 16. The roof frame 6, in a front area and in side areas, has a cable guide 20 for holding movably supported drive cables which can be driven via a hand crank or an electric drive. Above the cable guide 20 is a cable channel cover 19.

Figure 2:
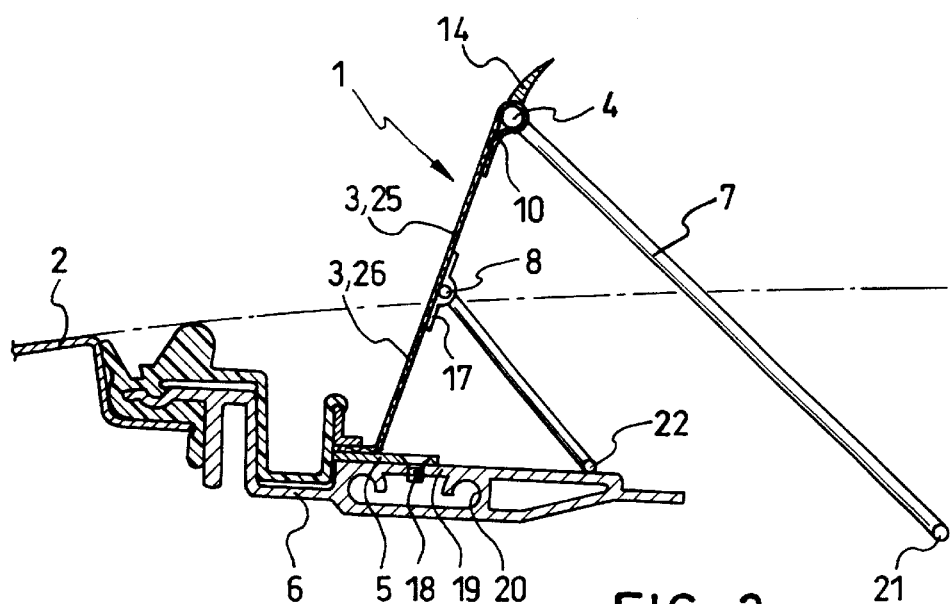
FIG. 2 shows a section A—A through the front edge of the motor vehicle roof of FIG. 1 with the wind deflector of the present invention in the opened state.

FIG. 2 shows the motor vehicle roof 2 with the cover 16 opened. A wind deflector 1 is arranged on the front edge of the roof opening 15 for raising up over the vehicle roof 2 with the opened cover 16 (compare FIG. 2) pushed to the rear via a swiveling raising arms or part 7 (or hoops). In the raised and opened state of the wind deflector 1 shown in FIG. 2, the swiveling raising arm 7, which is connected to the upper brace 4, and the other swiveling raising arm 9, which is connected to the other brace 8, are in the extended and opened state swiveled upward around the swiveling axes 21, 22. The layer 3 of wind deflector 1 is thus tensioned and is stabilized by the other brace 8 and the other swiveling part 9 to reduce noise and inhibit vibration. On the bottom end, the layer 3 is connected to the cable channel cover 19 and the roof frame 6 via a lower brace 5 made as a clamp strip via a screw 18, as is already known for example from German Patent 196 03 670 C1.

Figure 3:
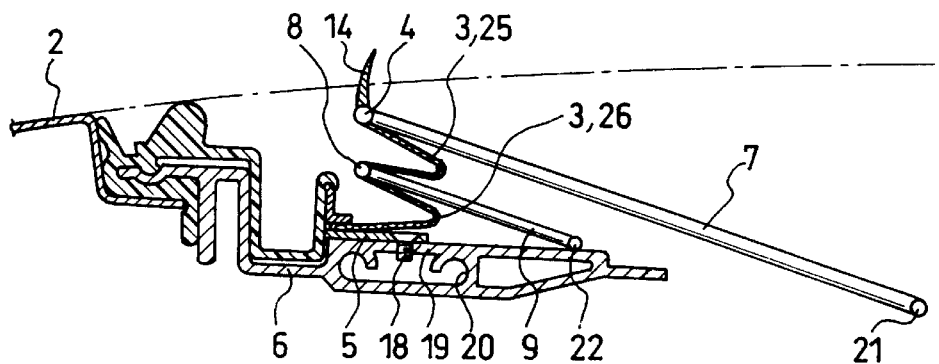
FIG. 3 shows a section A—A through the front edge of the motor vehicle roof of FIG. 1 with the wind deflector in the partially close state.

FIG. 3 shows the partially closed state of the wind deflector 1 with the upper brace 4 being located closer to the other brace 8. FIG. 3 also shows the layer 3, in its first section 25, between the upper brace 4 and the other brace 8, and in its second section 26, between the other brace 8 and the lower brace 5 being defined and reproducibly folded. The upper brace 4 and the other (middle) brace 8 are connected to the layer 3 by loops 10 and 17 (compare FIG. 2). The swiveling arm 7 can be coupled to its swiveling axis 21 on the area of the roof frame 6 which is not shown in FIGS. 2 and 3. On the top brace 4, a profile element 14 with streamlined cross section can be mounted.

Figure 4:
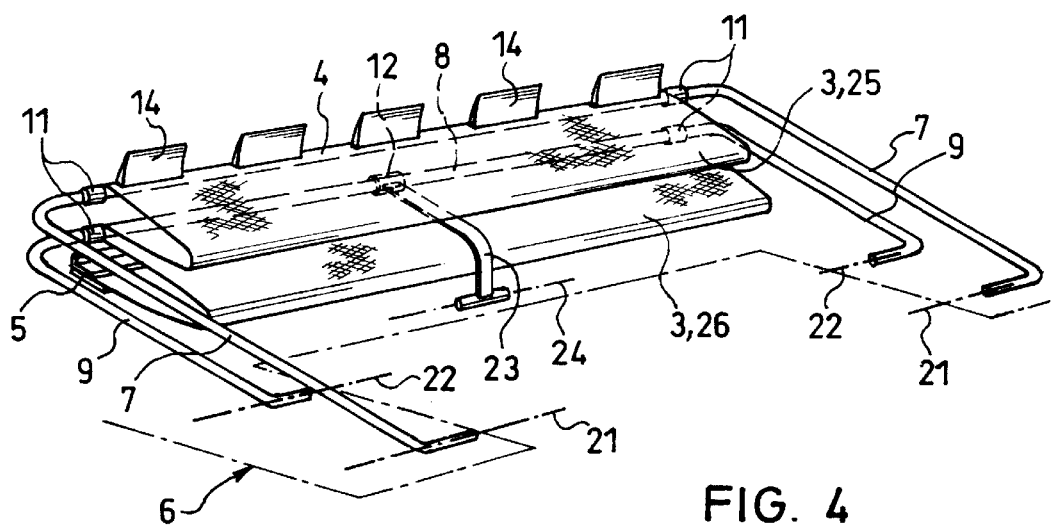
FIG. 4 shows a partial perspective of the wind deflector in the partially closed state.

Referring to FIG. 3 and FIG. 4, the connection of the swiveling raising arms 7 and 9 to the upper brace 4 and the other brace 8 via holding parts 11 is shown. Here the holding parts 11 are made detachable as known knurled nuts or knurled screws, and can have the embodiments known from German Patent 196 03 670 C1.

FIG. 4 furthermore shows another swiveling part 23 which is mounted roughly in the middle between the swiveling raising arms 7, 9 to be able to turn around the swiveling axis 24 on the schematically shown roof frame 6. The other swiveling part 23 causes further stabilization of the wind deflector 1 and is pivotally connected to the brace 8 for example via a sleeve 12.

We claim:

1. A wind deflector for one of a closable motor vehicle roof having a roof frame and a roof module having a roof frame, comprising:
   a flexible layer at least partially formed of an air-permeable net;
   a respective brace positioned on at least each of two opposing ends of said flexible layer, each of the at least two opposing ends of said flexible layer being attached to a respective brace;
   a swiveling raising arm mountable on the roof frame of one of the motor vehicle roof and roof module, one of said braces being connected laterally to said swiveling raising arm;
   at least one additional brace attached to said flexible layer; and
   another swiveling arm connected to said at least one additional brace.

2. The wind deflector of claim 1, wherein said respective braces includes a first upper brace and a second lower brace, said additional brace being located in a middle area between the first upper and the second lower braces when the wind deflector is in a raised state.

3. The wind deflector of claim 2, wherein the flexible layer includes at least one loop through which a respective one of the braces is routed for attachment.

4. The wind deflector of claim 1, wherein at least one of the respective braces and the additional brace is connected to the corresponding swiveling arm via a movable holding part.

5. The wind deflector of claim 4, wherein the holding part includes one of a knurled nut.

6. The wind deflector of claim 1, further including at least one profile element for stabilization of the wind deflector in the raised and opened state.

7. The wind deflector of claim 6, wherein the profile element is mounted on the upper brace.

8. The wind deflector of claim 6, wherein the profile element has an airfoil profile.

9. A motor vehicle roof, comprising:
   a roof frame;
   a wind deflector including a flexible layer at least partially formed of an air-permeable net and a respective brace positioned on at least each of two opposing ends of said flexible layer, each of the at least two opposing ends of said flexible layer being attached to a respective brace, said wind deflector further including a swiveling raising arm mountable on the roof frame of the motor vehicle roof, one of said braces being connected laterally to said swiveling raising arm, said wind deflector further including at least one additional brace attached to said flexible layer and another swiveling arm connected to said at least one additional brace.

10. The motor vehicle roof of claim 9, wherein said respective braces includes a first upper brace and a second lower brace, said additional brace being located in a middle area between the first upper and the second lower braces when the wind deflector is in a raised state.

11. The motor vehicle roof of claim 10, wherein the flexible layer includes at least one loop through which a respective one of the braces is routed for attachment.

12. The motor vehicle roof of claim 11, wherein at least one of the respective braces and the additional brace is connected to the corresponding swiveling arm via a movable holding part.

13. The motor vehicle roof of claim 9, further including at least one profile element for stabilization of the wind deflector in the raised and opened state.

14. The motor vehicle roof of claim 9, wherein the profile element is mounted on the upper brace.

15. A roof module for a motor vehicle, comprising:
   a roof frame;
   a wind deflector including a flexible layer at least partially formed of an air-permeable net and a respective brace positioned on at least each of two opposing ends of said flexible layer, each of at least two opposing ends of said flexible layer being attached to a respective brace, said wind deflector further including a swiveling raising arm mountable on the roof frame of the roof module, one of said braces being connected laterally to said swiveling raising arm, said wind deflector further including at least one additional brace attached to said flexible layer and another swiveling arm connected to said at least one additional brace.

16. The roof module of claim 15, wherein said respective braces includes a first upper brace and a second lower brace, said additional brace being located in a middle area between the first upper and the second lower braces when the wind deflector is in a raised state.

17. The roof module of claim 16, wherein the flexible layer includes at least one loop through which a respective one of the braces is routed for attachment.

18. The roof module of claim 17, wherein at least one of the respective braces and the additional brace is connected to the corresponding swiveling arm via a movable holding part.

19. The roof module of claim 15, further including at least one profile element for stabilization of the wind deflector in the raised and opened state.

\* \* \* \* \*